UNITED STATES PATENT OFFICE.

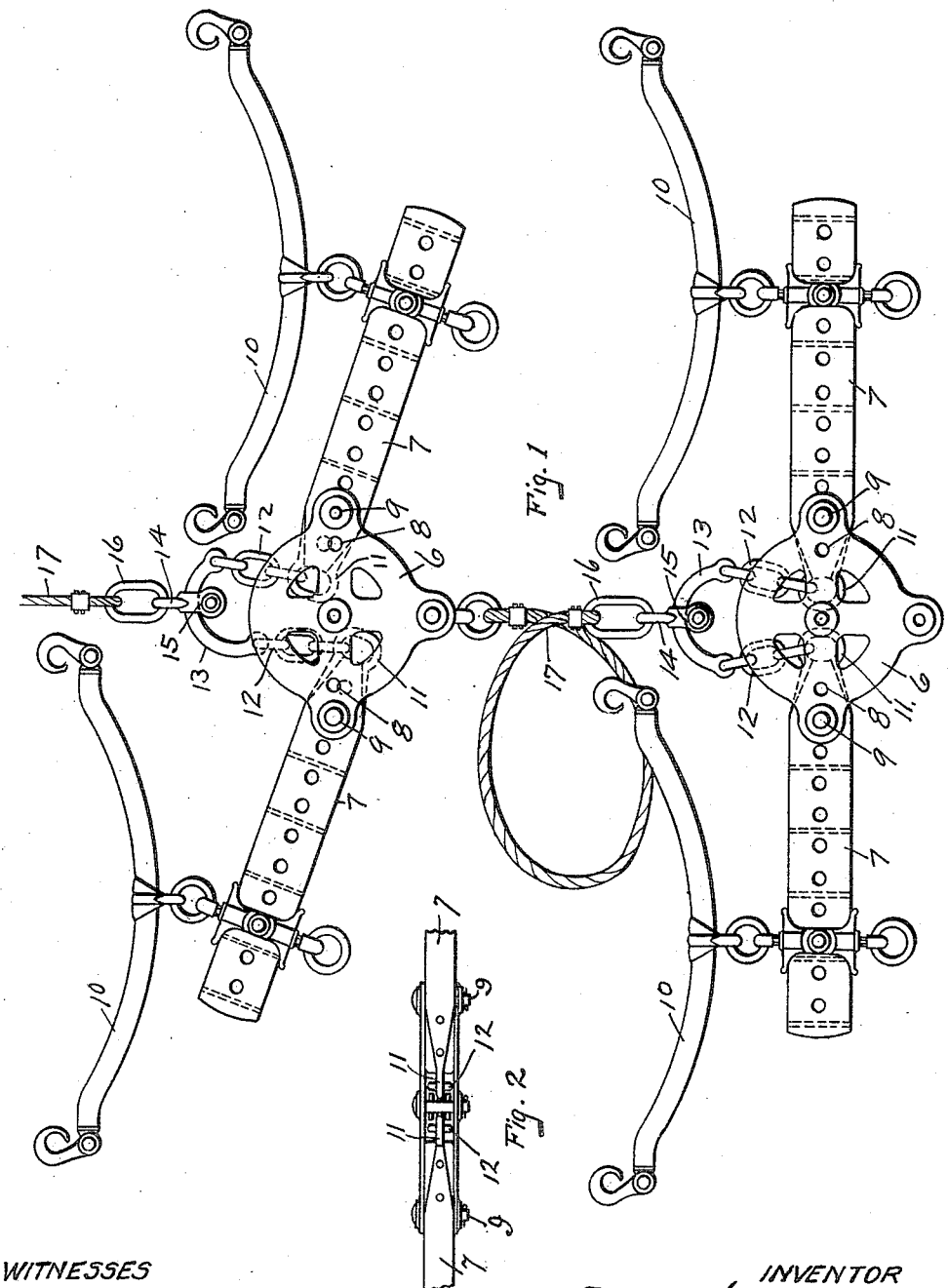

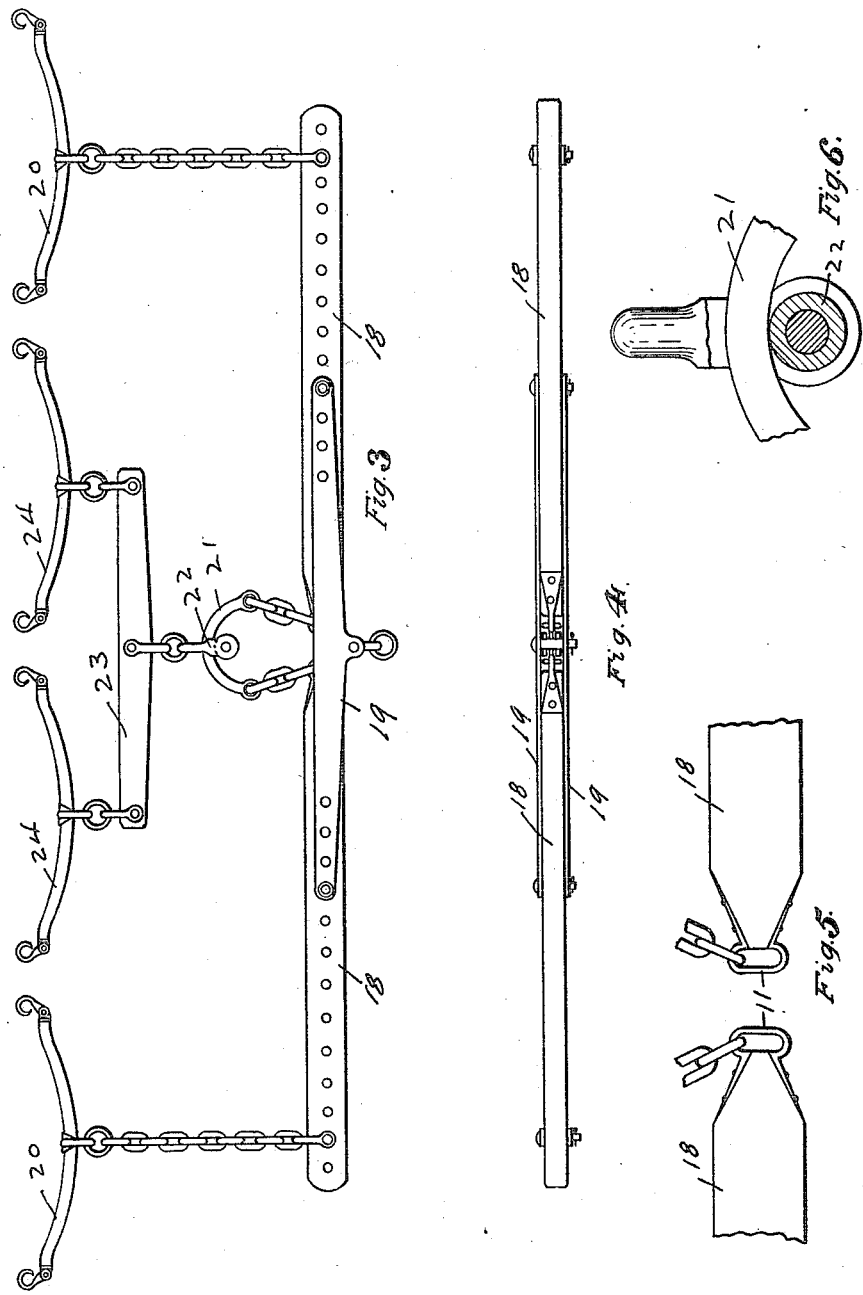

THOMAS S. MOFFETT, OF SPOKANE, WASHINGTON.

DRAFT DEVICE.

971,393.

Specification of Letters Patent. Patented Sept. 27, 1910.

Application filed September 21, 1909. Serial No. 518,802.

*To all whom it may concern:*

Be it known that I, THOMAS S. MOFFETT, a citizen of the United States, residing at Spokane, in the county of Spokane and State of Washington, have invented certain new and useful Improvements in Draft Devices, of which the following is a specification.

This invention is an equalizer hitch for a large number of horses, in which the parts are so arranged that any one horse may slacken up or neglect its work, without throwing the whole hitch out of line, and it consists in a novel construction and arrangement of parts to be hereinafter described and claimed, reference being had to the drawings hereto annexed forming a part of this specification, in which drawings—

Figure 1 is a plan view, and Fig. 2 an edge view of a portion of the device. Fig. 3 is a plan view of a modification, and Fig. 4 an edge view thereof. Fig. 5 is a detail of the inner ends of the levers hereinafter referred to. Fig. 6 is a sectional detail of the pulley member.

Referring more particularly to the drawings, 6 denotes a pair of spaced, substantially circular plates between which are pivotally mounted two levers 7 extending outwardly therefrom in opposite directions. In the plates, near opposite edges thereof, are holes 8 to receive pins 9, whereby the pivotal support of the levers is had, each lever having a series of holes, through one of which the pin is adapted to be passed, whereby the necessary adjustment of the pivots may be made.

Each lever carries at its outer end a swingletree 10, and at the inner ends of the levers are eyes 11. To each eye is connected a short chain 12. One of these chains is connected to one end of an arcuate bar 13, and the other chain is connected to the other end of said bar.

To the bar 13 is connected a hook 14 having a forked shank between the branches of which the bar is received, and between said branches is journaled a roller 15. The roller engages the inner edge of the bar.

The hook 14 is connected by means of a link 16 and a cable 17 or other flexible device, to another draft device similar to the one just described. A number of such draft devices are connected in series in this manner, one ahead of the other, the invention being more particularly designed for traveling threshers or other farm machinery requiring a large number of draft animals. At the rear ends of the plates 6 are eyes for attachment of the flexible connections.

Fig. 1 shows the position which the parts assume when one of the horses slackens up. The lever to which said horse is connected then swings rearwardly, and the companion lever swings forwardly, the bar 13 sliding over the roller 15, and accommodating itself to the swing of the levers. Inasmuch as the support for these two levers is flexibly connected to the lever supports of the draft devices in front and to the rear of the one mentioned, said front and rear devices are not affected by the said swinging movement of the levers, and the whole hitch is therefore not thrown out of line. When the lagging horse resumes the pull, the levers straighten out to their normal position.

The length of the arcuate member determines the extent to which the levers 7 can swing, the pulley coming to a stop when arriving at the end of the member, and thus preventing the lagging animal from dropping too far behind.

Fig. 1 shows an arrangement for two horses, and Fig. 3 an arrangement for four horses walking abreast. In the last-mentioned arrangement the two levers are indicated at 18, they being pivotally mounted between two spaced bars or plates 19, from which they extend laterally in opposite directions. The levers are adjustably connected to the plates as before, and they carry swingletrees 20 at their outer ends, which are adjustably connected thereto. The inner ends of the levers are connected to an arcuate member 21 in the same manner as the levers 7, to which member is connected a pulley 22 as before, carrying a doubletree 23, to the ends of which are connected swingletrees 24, which are in alinement with the swingletrees 20, so that the four horses may walk abreast.

I claim:

A draft device comprising a support consisting of spaced plates, a pair of oppositely extending levers pivotally mounted between the plates, the levers and plates having registering openings, pins passing through said openings whereby the pivotal supports of the levers are had, said levers having a plurality of openings to permit adjustment of the pivots, draft trees connected to the outer ends of the levers, a rigid arcuate member, a flexible connection between the ends of said member and the inner ends of the respective levers, said connection extending between the aforesaid plates, a pulley mounted on the arcuate member and slidable thereon, the ends of the arcuate member serving as stops to limit the sliding movement of the pulley, and determining the extent of the swing of the levers, and a draft device connected to the pulley.

In testimony whereof I affix my signature in presence of two witnesses.

THOMAS S. MOFFETT.

Witnesses:
H. E. SMITH,
NETTIE KING.